United States Patent
Hagler

(10) Patent No.: US 12,353,458 B2
(45) Date of Patent: Jul. 8, 2025

(54) DEEP LINKING USING GENERATIVE ARTIFICIAL INTELLIGENCE

(71) Applicant: Google LLC, Mountain View, CA (US)

(72) Inventor: Maxwell Ryan Hagler, Darien, CT (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/778,286

(22) Filed: Jul. 19, 2024

(65) Prior Publication Data

US 2025/0028747 A1    Jan. 23, 2025

Related U.S. Application Data

(60) Provisional application No. 63/515,044, filed on Jul. 21, 2023.

(51) Int. Cl.

| | | |
|---|---|---|
| G06F 16/00 | (2019.01) | |
| G06F 16/242 | (2019.01) | |
| G06F 16/334 | (2025.01) | |
| G06F 16/338 | (2019.01) | |
| G06N 3/0475 | (2023.01) | |

(52) U.S. Cl.
CPC ........ *G06F 16/3344* (2019.01); *G06F 16/243* (2019.01); *G06F 16/338* (2019.01); *G06N 3/0475* (2023.01)

(58) Field of Classification Search
CPC .................................................. G06F 16/243
See application file for complete search history.

(56) References Cited

U.S. PATENT DOCUMENTS

2024/0281487 A1 * 8/2024 Bathwal .............. G06F 16/9558

OTHER PUBLICATIONS

Adiwardana et al., "Towards a human-like open-domain chatbot" CoRR, Submitted on Feb. 2020, arXiv:2001.09977v3, 38 pages.
Brown et al., "Language models are few-shot learners" CoRR, Submitted on Jul. 2020, arXiv:2005.14165v4, 75 pages.
Hoffmann et al., "Training compute-optimal large language models" CoRR, Submitted on Mar. 2022, arXiv:2203.15556v1, 36 pages.
Rae et al., "Scaling language models: Methods, analysis & insights from training gopher" CoRR, Submitted on Dec. 2021, arXiv:2112.11446v1, 118 pages.
Raffel et al., "Exploring the limits of transfer learning with a unified text-to-text transformer" CoRR, Submitted on Sep. 2023, arXiv:1910.10683v4, 67 pages.

* cited by examiner

*Primary Examiner* — Ajith Jacob
(74) *Attorney, Agent, or Firm* — Fish & Richardson P.C.

(57) ABSTRACT

Methods, systems, and apparatus, including computer programs encoded on a computer storage medium for using artificial intelligence to generate responses. In one aspect, a method includes receiving a query from a client device. Search results for resources determined to be relevant to the query are provided. The search system provides, for display with a given search result of the set of search results, a prompt input interface that enables the user to input a prompt for an artificial intelligence subsystem of the search system. A prompt input is received from the client device. An artificial intelligence subsystem uses a language model to select, from a set of resources hosted by a same domain as the corresponding resource linked to by the given search result, one or more additional resources based at least on the prompt input by the user and the query.

20 Claims, 6 Drawing Sheets

DEEP LINKING USING GENERATIVE ARTIFICIAL INTELLIGENCE

CROSS-REFERENCE TO RELATED APPLICATIONS

This application claims priority of U.S. Provisional Application No. 63/515,044 filed Jul. 21, 2023. The prior application is incorporated herein by reference in its entirety and for all purposes.

BACKGROUND

This specification relates to data processing, artificial intelligence, and providing deep links to specific pages in conversational responses. Advances in machine learning are enabling artificial intelligence to be implemented in more applications. For example, large language models have been implemented to allow for a conversational interaction with computers using natural language rather than a restricted set of prompts. This allows for a more natural interaction with the computer.

SUMMARY

In general, one innovative aspect of the subject matter described in this specification can be embodied in methods that include the actions of receiving, by a search system, a query from a client device of a user; providing, for display in a user interface of the client device, a set of search results for resources determined to be relevant to the query, each search result including information about a corresponding resource and a link to the corresponding resource; providing, by the search system and for display with a given search result of the set of search results, a prompt input interface that enables the user to input a prompt for an artificial intelligence subsystem of the search system; receiving, from the client device, the prompt input by the user; selecting, by the artificial intelligence subsystem using a language model and from a set of resources hosted by a same domain as the corresponding resource linked to by the given search result, one or more additional resources based at least on the prompt input by the user and the query, the selecting comprising providing, to the language model, a prompt generated based on the prompt input by the user and the query; and providing, for display with the given search result, a conversational response comprising commentary about a subject of each of the one or more additional resources and a link to each of the one or more additional resources. Other implementations of this aspect include corresponding apparatus, systems, and computer programs, configured to perform the aspects of the methods, encoded on computer storage devices.

These and other embodiments can each optionally include one or more of the following features. In some aspects, the prompt is a natural language input.

Some aspects can include providing a second prompt input interface that enables the user to input a second prompt; receiving the second prompt input by the user; selecting, by the artificial intelligence subsystem and from the set of resources hosted by the same domain, one or more second resources based at least on the query, the prompt, the conversational response, and the second prompt; and providing, for display by the client device, a second conversational response including commentary about a subject of each of the one or more second resources and a link to each of the one or more second resources. The query, the given search result, the prompt, the conversational response, the second prompt, and the second conversational response can form a conversation and are presented in a conversational user interface.

In some aspects, the prompt is displayed below the given search result, and the conversational response is displayed below the prompt.

In some aspects, the prompt is displayed adjacent to the given search result, and the conversational response is displayed adjacent to the prompt.

In some aspects, selecting the one or more additional resources based at least on the prompt input by the user and the query includes determining a user's intent based at least on the prompt input by the user and the query and selecting the one or more additional resources according to the user's intent. The user's intent can be determined from potential intents including (i) an information seeking intent, (ii) an action seeking intent, (iii) a navigation seeking intent, or any combination of (i) to (iii).

Some aspects can include receiving a request including a list of items from the client device of the user, identifying items included in the list from a particular website that offers the items, and adding the items to a virtual cart of the particular website.

In some aspects, the commentary about a subject of each of the one or more additional resources includes at least one of (i) a description of the subject of each of the one or more additional resources or (ii) a description of information included in each of the one or more additional resources.

Particular embodiments of the subject matter described in this specification can be implemented so as to realize one or more of the following advantages. The techniques described in this specification enable an artificial intelligence (AI) system to determine (e.g., predict) a user's intent based on their queries and/or prompts, resulting in responses that are more in line with the user's desired meaning. For instance, the AI system can search through various webpages within a website and/or application pages in an application (or an index, database, or other data structure that includes such information) and identify the information and resources that best meet the user's needs. This enhances the search results and improves their quality. Additionally, by narrowing down the selection of resources based on the user's intent, the AI system avoids selecting and providing irrelevant resources, thereby reducing the time and computing resources needed to generate the responses. As a result, the system becomes capable of generating responses more quickly, making them suitable for real-time interactive environments, such as responding to a user's search query. By determining a user's intent based on queries, prompt inputs, and/or other information, the AI system provides more accurate responses, which results in reduced network traffic (and corresponding bandwidth usage and resulting latency) and consumed computing resources to provide responses. For example, absent the described techniques, the system would have to iteratively interact with the user by providing multiple responses until the user obtains the desired information.

The system can enable a user to request additional information about a subject (e.g., item) of a search result by providing a prompt input interface with the search result. Using a prompt in this manner enables the user to request specific information or ask specific questions about specific items of specific resources, which enables the AI system to more accurately determine the intent of the user and provide more relevant information to the user, without wasting network bandwidth and computing resources associated with a user navigating to multiple resources to obtain the desired information. This also enables the user to ask focused questions or submit focused requests about a specific item or specific resource without having to generate and submit new search queries to the search system, which reduces the computational burden placed on search systems in selecting resources and generating search result pages that link to the resources. This also improves the performance of the user's device by reducing the amount of time that the display has to be active, and the amount of data sent from and to the device, which improves battery life for mobile device.

By including a prompt input interface with a search result also narrows the search space for generating a response to a prompt entered into the prompt input interface. Rather than process the query against an index of many different resources hosted by many different domains, the AI system can limit the search space to the domain of the resource corresponding to the search result in which the user enters a prompt into the prompt input interface. This can greatly reduce the amount of computational resources used to process the prompt and the associated latency, while providing the most relevant information that best satisfies the user's informational needs.

The system can provide responses to queries and/or prompts in the form of deep links to specific pages, which can be in the form of a conversational response. Using deep links in this way allows the user to navigate directly to a specific resource, rather than a general landing page for a search result. This can greatly reduce the number of resources to which a user navigates to find a resource that satisfies the user's informational needs, which also reduces the amount of wasted bandwidth and burden placed on computational resources that would otherwise occur absent the described techniques. For example, absent the described techniques, the user would have to navigate to the landing page, then search for a link to another page that has the relevant content, or navigate through many pages before finding relevant content or giving up. By displaying the deep links within a conversational response, the artificial intelligence system can provide additional information about each deep link to help the user interact with (e.g., select) the deep link to the most relevant resource, further reducing the wasted bandwidth and computational resources.

Using prompt interfaces in search results, AI to identify and generate deep links, and displaying deep links in response to the prompts enables the AI system to identify the most relevant resource(s) of a user-selected website that provides content that best matches the user's prompt and enables the user to access such content with one user interaction, e.g., selecting the deep link. This specific application of AI that includes a combination of user intent, user prompt within a particular search result (and data about the resource corresponding to the search result), and a trained AI model provides a synergistic effect of generating accurate results that reduce the amount of navigations between web pages and user queries provided to the AI system, which improves the performance of both user devices that submit the requests (e.g., by reducing the amount of data sent by the user device, the amount of data received by the user device and the amount of time that the display is active for displaying content) and the servers that respond to the requests (e.g., by reducing the amount of data processed by machine learning models and the amount of responses generated by the servers). This improves network latency by reducing network traffic between client devices and servers, reduces the load of user device batteries, which improves the power management of the device, and reduces the number of processor cycles required to generate responses.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
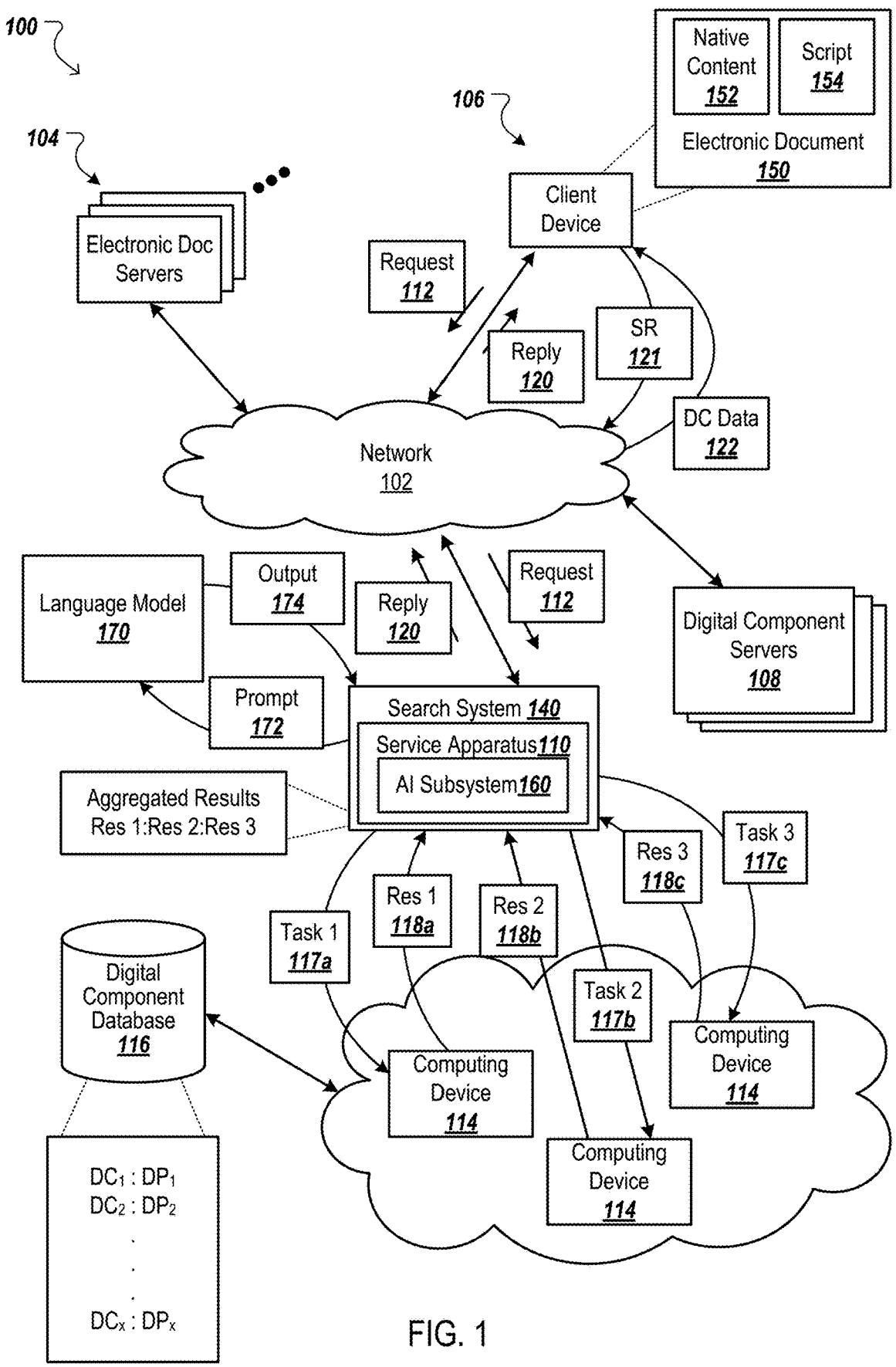
FIG. 1 is a block diagram of an example environment in which prompt-based artificial intelligence searches can be performed.

This specification describes techniques for enabling artificial intelligence (AI) to generate and provide deep links to specific resources that include content that satisfies a user's specific needs and requests. Artificial intelligence is a segment of computer science that focuses on the creation of intelligent agents that can learn and act autonomously (e.g., without human intervention). Artificial intelligence can utilize machine learning, which focuses on developing algorithms that can learn from data, natural language processing, which focuses on understanding and generating human language, and/or computer vision, which is a field that focuses on understanding and interpreting images and videos.

The techniques described throughout this specification enable artificial intelligence to predict a user's intent based on one or more user queries and prompts input by the user, and provide responses according to the user's intent. For example, the AI system can search various webpages of a website and select one or more webpages that satisfy the user's intent. The AI system can better navigate the user to the right information or resources included in the website. Thus, the techniques described herein can enhance the search results and improve the quality of the search results by providing conversational responses that better align with the user's intent. Further, by limiting the resources using the user's intent (e.g., by constraining an AI model based on the user's intent), the AI system will not select resources that are not relevant to the user, which reduce the time required to generate the conversational responses, and the computing resources required to generate the responses. This all contributes to a system capable of generating responses faster, such that they can be created and served in a real time interactive environment—e.g., in response to a user search query.

In some implementations, the techniques described herein can continue this process of collecting a new prompt and providing a new conversational response based on the previous interaction. In this way, the search system can continuously interact with the user and update the user's intent as the conversation continues. Based on the updated user's intent, the search system can provide the new conversational response that satisfies the updated user intent. As a result, the user can keep receiving a specific response directly according to the user's specific needs and requests that are updated during the conversation, without having to search the requested information from the various resources hosted by the domain, e.g., webpages of the same website.

In some implementations, the search system can provide digital components for display with search results displayed in a search result page. For example, a digital component can be in the form of a sponsored search result. In this example, the digital component can look the same as organic search results. In another example, digital components can be displayed at the top of search results pages, on the sides of the search result pages (e.g., adjacent to search results), and/or in other locations.

As used throughout this document, the phrase "digital component" refers to a discrete unit of digital content or digital information (e.g., a video clip, audio clip, multimedia clip, gaming content, image, text, bullet point, artificial intelligence output, language model output, or another unit of content). A digital component can electronically be stored in a physical memory device as a single file or in a collection of files, and digital components can take the form of video files, audio files, multimedia files, image files, or text files and include advertising information, such that an advertisement is a type of digital component.

FIG. 1 is a block diagram of an example environment 100 in which generative artificial intelligence can be implemented. The example environment 100 includes a network 102, such as a local area network (LAN), a wide area network (WAN), the Internet, or a combination thereof. The network 102 connects electronic document servers 104, user devices 106, digital component servers 108, and a service apparatus 110. The example environment 100 may include many different electronic document servers 104, user devices 106, and digital component servers 108.

A client device 106 is an electronic device capable of requesting and receiving online resources over the network 102. Example client devices 106 include personal computers, gaming devices, mobile communication devices, digital assistant devices, augmented reality devices, virtual reality devices, and other devices that can send and receive data over the network 102. A client device 106 typically includes a user application, such as a web browser, to facilitate the sending and receiving of data over the network 102, but native applications (other than browsers) executed by the client device 106 can also facilitate the sending and receiving of data over the network 102.

A gaming device is a device that enables a user to engage in gaming applications, for example, in which the user has control over one or more characters, avatars, or other rendered content presented in the gaming application. A gaming device typically includes a computer processor, a memory device, and a controller interface (either physical or visually rendered) that enables user control over content rendered by the gaming application. The gaming device can store and execute the gaming application locally, or execute a gaming application that is at least partly stored and/or served by a cloud server (e.g., online gaming applications). Similarly, the gaming device can interface with a gaming server that executes the gaming application and "streams" the gaming application to the gaming device. The gaming device may be a tablet device, mobile telecommunications device, a computer, or another device that performs other functions beyond executing the gaming application.

Digital assistant devices include devices that include a microphone and a speaker. Digital assistant devices are generally capable of receiving input by way of voice, and respond with content using audible feedback, and can present other audible information. In some situations, digital assistant devices also include a visual display or are in communication with a visual display (e.g., by way of a wireless or wired connection). Feedback or other information can also be provided visually when a visual display is present. In some situations, digital assistant devices can also control other devices, such as lights, locks, cameras, climate control devices, alarm systems, and other devices that are registered with the digital assistant device.

As illustrated, the client device 106 is presenting an electronic document 150, which is also referred to herein as a resource. An electronic document is data that presents a set of content at a client device 106. Examples of electronic documents include webpages, word processing documents, portable document format (PDF) documents, images, videos, search results pages, and feed sources. Native applications (e.g., "apps" and/or gaming applications), such as applications installed on mobile, tablet, or desktop computing devices, and the content (e.g., app pages) displayed by the applications are also examples of resources. Electronic documents can be provided to client devices 106 by electronic document servers 104 ("Electronic Doc Servers").

For example, the electronic document servers 104 can include servers that host publisher websites. In this example, the client device 106 can initiate a request for a given publisher webpage, and the electronic server 104 that hosts the given publisher webpage can respond to the request by sending machine executable instructions that initiate presentation of the given webpage at the client device 106.

In another example, the electronic document servers 104 can include app servers from which client devices 106 can download apps. In this example, the client device 106 can download files required to install an app at the client device 106, and then execute the downloaded app locally (i.e., on the client device). Alternatively, or additionally, the client device 106 can initiate a request to execute the app, which is transmitted to a cloud server. In response to receiving the request, the cloud server can execute the application and stream a user interface of the application to the client device 106 so that the client device 106 does not have to execute the app itself. Rather, the client device 106 can present the user interface generated by the cloud server's execution of the app, and communicate any user interactions with the user interface back to the cloud server for processing.

Electronic documents can include a variety of content. For example, an electronic document 150 can include native content 152 that is within the electronic document 150 itself and/or does not change over time. Electronic documents can also include dynamic content that may change over time or on a per-request basis. For example, a publisher of a given electronic document (e.g., electronic document 150) can maintain a data source that is used to populate portions of the electronic document. In this example, the given electronic document can include a script, such as the script 154, that causes the client device 106 to request content (e.g., a digital component) from the data source when the given electronic document is processed (e.g., rendered or executed) by a client device 106 (or a cloud server). The client device 106 (or cloud server) integrates the content (e.g., digital component) obtained from the data source into the given electronic document to create a composite electronic document including the content obtained from the data source.

In some situations, a given electronic document (e.g., electronic document 150) can include a digital component script (e.g., script 154) that references the service apparatus 110, or a particular service provided by the service apparatus 110. In these situations, the digital component script is executed by the client device 106 when the given electronic document is processed by the client device 106. Execution of the digital component script configures the client device 106 to generate a request for digital components 112 (referred to as a "component request"), which is transmitted over the network 102 to the service apparatus 110. For example, the digital component script can enable the client device 106 to generate a packetized data request including a header and payload data. The component request 112 can include event data specifying features such as a name (or network location) of a server from which the digital component is being requested, a name (or network location) of the requesting device (e.g., the client device 106), and/or information that the service apparatus 110 can use to select one or more digital components, or other content, provided in response to the request. The component request 112 is transmitted, by the client device 106, over the network 102 (e.g., a telecommunications network) to a server of the service apparatus 110.

The component request 112 can include event data specifying other event features, such as the electronic document being requested and characteristics of locations of the electronic document at which digital component can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the service apparatus 110. Similarly, event data specifying keywords associated with the electronic document ("document keywords") or entities (e.g., people, places, or things) that are referenced by the electronic document can also be included in the component request 112 (e.g., as payload data) and provided to the service apparatus 110 to facilitate identification of digital components that are eligible for presentation with the electronic document. The event data can also include a search query that was submitted from the client device 106 to obtain a search results page.

Component requests 112 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 112 can be transmitted, for example, over a packetized network, and the component requests 112 themselves can be formatted as packetized data having a header and payload data. The header can specify a destination of the packet and the payload data can include any of the information discussed above.

The service apparatus 110 chooses digital components (e.g., third-party content, such as video files, audio files, images, text, gaming content, augmented reality content, and combinations thereof, which can all take the form of advertising content or non-advertising content) that will be presented with the given electronic document (e.g., at a location specified by the script 154) in response to receiving the component request 112 and/or using information included in the component request 112.

In some implementations, a digital component is selected in less than a second to avoid errors that could be caused by delayed selection of the digital component. For example, delays in providing digital components in response to a component request 112 can result in page load errors at the client device 106 or cause portions of the electronic document to remain unpopulated even after other portions of the electronic document are presented at the client device 106.

Also, as the delay in providing the digital component to the client device 106 increases, it is more likely that the electronic document will no longer be presented at the client device 106 when the digital component is delivered to the client device 106, thereby negatively impacting a user's experience with the electronic document. Further, delays in providing the digital component can result in a failed delivery of the digital component, for example, if the electronic document is no longer presented at the client device 106 when the digital component is provided.

In some implementations, the service apparatus 110 is implemented in a distributed computing system that includes, for example, a server and a set of multiple computing devices 114 that are interconnected and identify and distribute digital component in response to requests 112. The set of multiple computing devices 114 operate together to identify a set of digital components that are eligible to be presented in the electronic document from among a corpus of millions of available digital components ($DC_{1-x}$). The millions of available digital components can be indexed, for example, in a digital component database 116. Each digital component index entry can reference the corresponding digital component and/or include distribution parameters ($DP_1$-$DP_x$) that contribute to (e.g., trigger, condition, or limit) the distribution/transmission of the corresponding digital component. For example, the distribution parameters can contribute to (e.g., trigger) the transmission of a digital component by requiring that a component request include at least one criterion that matches (e.g., either exactly or with some pre-specified level of similarity) one of the distribution parameters of the digital component.

In some implementations, the distribution parameters for a particular digital component can include distribution keywords that must be matched (e.g., by electronic documents, document keywords, or terms specified in the component request 112) in order for the digital component to be eligible for presentation. Additionally, or alternatively, the distribution parameters can include embeddings that can use various different dimensions of data, such as website details and/or consumption details (e.g., page viewport, user scrolling speed, or other information about the consumption of data). The distribution parameters can also require that the component request 112 include information specifying a particular geographic region (e.g., country or state) and/or information specifying that the component request 112 originated at a particular type of client device (e.g., mobile device or tablet device) in order for the digital component to be eligible for presentation. The distribution parameters can also specify an eligibility value (e.g., ranking score, or some other specified value) that is used for evaluating the eligibility of the digital component for distribution/transmission (e.g., among other available digital components).

The identification of the eligible digital component can be segmented into multiple tasks 117a-117c that are then assigned among computing devices within the set of multiple computing devices 114. For example, different computing devices in the set 114 can each analyze a different portion of the digital component database 116 to identify various digital components having distribution parameters that match information included in the component request 112. In some implementations, each given computing device in the set 114 can analyze a different data dimension (or set of dimensions) and pass (e.g., transmit) results (Res 1-Res 3) 118a-118c of the analysis back to the service apparatus 110. For example, the results 118a-118c provided by each of the computing devices in the set 114 may identify a subset of digital components that are eligible for distribution in response to the component request and/or a subset of the digital component that have certain distribution parameters. The identification of the subset of digital components can include, for example, comparing the event data to the distribution parameters, and identifying the subset of digital components having distribution parameters that match at least some features of the event data.

The service apparatus 110 aggregates the results 118a-118c received from the set of multiple computing devices 114 and uses information associated with the aggregated results to select one or more digital components that will be provided in response to the request 112. For example, the service apparatus 110 can select a set of winning digital components (one or more digital components) based on the outcome of one or more content evaluation processes, as discussed below. In turn, the service apparatus 110 can generate and transmit, over the network 102, reply data 120 (e.g., digital data representing a reply) that enable the client device 106 to integrate the set of winning digital components into the given electronic document, such that the set of winning digital components (e.g., winning third-party content) and the content of the electronic document are presented together at a display of the client device 106.

In some implementations, the client device 106 executes instructions included in the reply data 120, which configures and enables the client device 106 to obtain the set of winning digital components from one or more digital component servers 108. For example, the instructions in the reply data 120 can include a network location (e.g., a Uniform Resource Locator (URL)) and a script that causes the client device 106 to transmit a server request (SR) 121 to the digital component server 108 to obtain a given winning digital component from the digital component server 108. In response to the request, the digital component server 108 will identify the given winning digital component specified in the server request 121 (e.g., within a database storing multiple digital components) and transmit to the client device 106, digital component data (DC Data) 122 that presents the given winning digital component in the electronic document at the client device 106.

When the client device 106 receives the digital component data 122, the client device 106 will render the digital component (e.g., third-party content), and present the digital component at a location specified by, or assigned to, the script 154. For example, the script 154 can create a walled garden environment, such as a frame, that is presented within, e.g., beside, the native content 152 of the electronic document 150. In some implementations, the digital component is overlayed over (or adjacent to) a portion of the native content 152 of the electronic document 150, and the service apparatus 110 can specify the presentation location within the electronic document 150 in the reply 120. For example, when the native content 152 includes video content, the service apparatus 110 can specify a location or object within the scene depicted in the video content over which the digital component is to be presented.

A search system 140 can receive a query from the client device 106. The query can be one or more search terms provided by the user. The search system 140 can provide a set of search results for resources in response to the request 112 for display on the client device 106. The search system 140 can provide digital components for display with the search results displayed in a search result page. The search system 140 can also provide a prompt input interface, for a given search result, that enables the user to input a prompt. The search system 140 can include the service apparatus 110. In some implementations, the search system 140 and the service apparatus can be separate. For example, the search system 140 can submit a request to the service apparatus 110 for digital components, receive the digital components from the service apparatus 110, and provide the digital components to the client device 106. The search system 140 can also include an artificial intelligence ("AI") subsystem 160 configured to autonomously generate digital components, either prior to a request 112 (e.g., offline) and/or in response to a request 112 (e.g., online or real-time). As described in more detail throughout this specification, the AI subsystem 160 can collect online content about a specific entity (e.g., digital component provider or another entity) and summarize the collected online content using one or more language models 170, which can include large language models.

A large language model ("LLM") is a model that is trained to generate and understand human language. LLMs are trained on massive datasets of text and code, and they can be used for a variety of tasks. For example, LLMs can be trained to translate text from one language to another; summarize text, such as web site content, search results, news articles, or research papers; answer questions about text, such as "What is the capital of Georgia?"; create chatbots that can have conversations with humans; and generate creative text, such as poems, stories, and code.

The language model 170 can be any appropriate language model neural network that receives an input sequence made up of text tokens selected from a vocabulary and auto-regressively generates an output sequence made up of text tokens from the vocabulary. For example, the language model 170 can be a Transformer-based language model neural network or a recurrent neural network-based language model.

In some situations, the language model 170 can be referred to as an auto-regressive neural network when the neural network used to implement the language model 170 auto-regressively generates an output sequence of tokens. More specifically, the auto-regressively generated output is created by generating each particular token in the output sequence conditioned on a current input sequence that includes any tokens that precede the particular text token in the output sequence, i.e., the tokens that have already been generated for any previous positions in the output sequence that precede the particular position of the particular token, and a context input that provides context for the output sequence.

For example, the current input sequence when generating a token at any given position in the output sequence can include the input sequence and the tokens at any preceding positions that precede the given position in the output sequence. As a particular example, the current input sequence can include the input sequence followed by the tokens at any preceding positions that precede the given position in the output sequence. Optionally, the input and the current output sequence can be separated by one or more predetermined tokens within the current input sequence.

More specifically, to generate a particular token at a particular position within an output sequence, the neural network of the language model 170 can process the current input sequence to generate a score distribution, e.g., a probability distribution, that assigns a respective score, e.g., a respective probability, to each token in the vocabulary of tokens. The neural network of the language model 170 can then select, as the particular token, a token from the vocabulary using the score distribution. For example, the neural network of the language model 170 can greedily select the highest-scoring token or can sample, e.g., using nucleus sampling or another sampling technique, a token from the distribution.

As a particular example, the language model 170 can be an auto-regressive Transformer-based neural network that includes (i) a plurality of attention blocks that each apply a self-attention operation and (ii) an output subnetwork that processes an output of the last attention block to generate the score distribution.

The language model 170 can have any of a variety of Transformer-based neural network architectures. Examples of such architectures include those described in J. Hoffmann, S. Borgcaud, A. Mensch, E. Buchatskaya, T. Cai, E. Rutherford, D. d. L. Casas, L. A. Hendricks, J. Welbl, A. Clark, et al. Training compute-optimal large language models, arXiv preprint arXiv: 2203.15556, 2022; J. W. Rac, S. Borgeaud, T. Cai, K. Millican, J. Hoffmann, H. F. Song, J. Aslanides, S. Henderson, R. Ring, S. Young, E. Rutherford, T. Hennigan, J. Menick, A. Cassirer, R. Powell, G. van den Driessche, L. A. Hendricks, M. Rauh, P. Huang, A. Glacse, J. Welbl, S. Dathathri, S. Huang, J. Uesato, J. Mellor, I. Higgins, A. Creswell, N. McAleese, A. Wu, E. Elsen, S. M. Jayakumar, E. Buchatskaya, D. Budden, E. Sutherland, K. Simonyan, M. Paganini, L. Sifre, L. Martens, X. L. Li, A. Kuncoro, A. Nematzadeh, E. Gribovskaya, D. Donato, A. Lazaridou, A. Mensch, J. Lespiau, M. Tsimpoukelli, N. Grigorev, D. Fritz, T. Sottiaux, M. Pajarskas, T. Pohlen, Z. Gong, D. Toyama, C. de Masson d'Autume, Y. Li, T. Terzi, V. Mikulik, I. Babuschkin, A. Clark, D. de Las Casas, A. Guy, C. Jones, J. Bradbury, M. Johnson, B. A. Hechtman, L. Weidinger, I. Gabriel, W. S. Isaac, E. Lockhart, S. Osindero, L. Rimell, C. Dyer, O. Vinyals, K. Ayoub, J. Stanway, L. Bennett, D. Hassabis, K. Kavukcuoglu, and G. Irving. Scaling language models: Methods, analysis & insights from training gopher. CoRR, abs/2112.11446, 2021; Colin Raffel, Noam Shazeer, Adam Roberts, Katherine Lee, Sharan Narang, Michael Matena, Yanqi Zhou, Wei Li, and Peter J Liu. Exploring the limits of transfer learning with a unified text-to-text transformer. arXiv preprint arXiv: 1910.10683, 2019; Daniel Adiwardana, Minh-Thang Luong, David R. So, Jamie Hall, Noah Fiedel, Romal Thoppilan, Zi Yang, Apoorv Kulshreshtha, Gaurav Nemade, Yifeng Lu, and Quoc V. Le. Towards a human-like open-domain chatbot. CoRR, abs/2001.09977, 2020; and Tom B Brown, Benjamin Mann, Nick Ryder, Melanie Subbiah, Jared Kaplan, Prafulla Dhariwal, Arvind Neelakantan, Pranav Shyam, Girish Sastry, Amanda Askell, et al. Language models are few-shot learners. arXiv preprint arXiv: 2005.14165, 2020.

Generally, however, the Transformer-based neural network includes a sequence of attention blocks, and, during the processing of a given input sequence, each attention block in the sequence receives a respective input hidden state for each input token in the given input sequence. The attention block then updates each of the hidden states at least in part by applying self-attention to generate a respective output hidden state for each of the input tokens. The input hidden states for the first attention block are embeddings of the input tokens in the input sequence and the input hidden states for each subsequent attention block are the output hidden states generated by the preceding attention block.

In this example, the output subnetwork processes the output hidden state generated by the last attention block in the sequence for the last input token in the input sequence to generate the score distribution.

Generally, because the language model is auto-regressive, the service apparatus 110 can use the same language model 170 to generate multiple different candidate output sequences in response to the same request, e.g., by using beam search decoding from score distributions generated by the language model 170, using a Sample-and-Rank decoding strategy, by using different random seeds for the pseudo-random number generator that's used in sampling for different runs through the language model 170 or using another decoding strategy that leverages the auto-regressive nature of the language model.

In some implementations, the language model 170 is pre-trained, i.e., trained on a language modeling task that does not require providing evidence in response to user questions, and the service apparatus 110 (e.g., using AI subsystem 160) causes the language model 170 to generate output sequences according to the pre-determined syntax through natural language prompts in the input sequence.

For example, the service apparatus 110 (e.g., AI subsystem 160), or a separate training system, pre-trains the language model 170 (e.g., the neural network) on a language modeling task, e.g., a task that requires predicting, given a current sequence of text tokens, the next token that follows the current sequence in the training data. As a particular example, the language model 170 can be pre-trained on a maximum-likelihood objective on a large dataset of text, e.g., text that is publicly available from the Internet or another text corpus.

In some implementations, the AI subsystem 160 can receive from the search system 140, a prompt 172 that is input by the user. The prompt 172 is submitted to the language model 170, and causes the language model 170 to generate an output 174. To initiate creation of the output 174, the AI subsystem 160 submits the prompt 172 to the one or more language models 170, which use the prompt 172 to evaluate the information found based on the prompt 172, and generate the output 174 using the information according to the constraints specified in the prompt 172.

Figure 2:
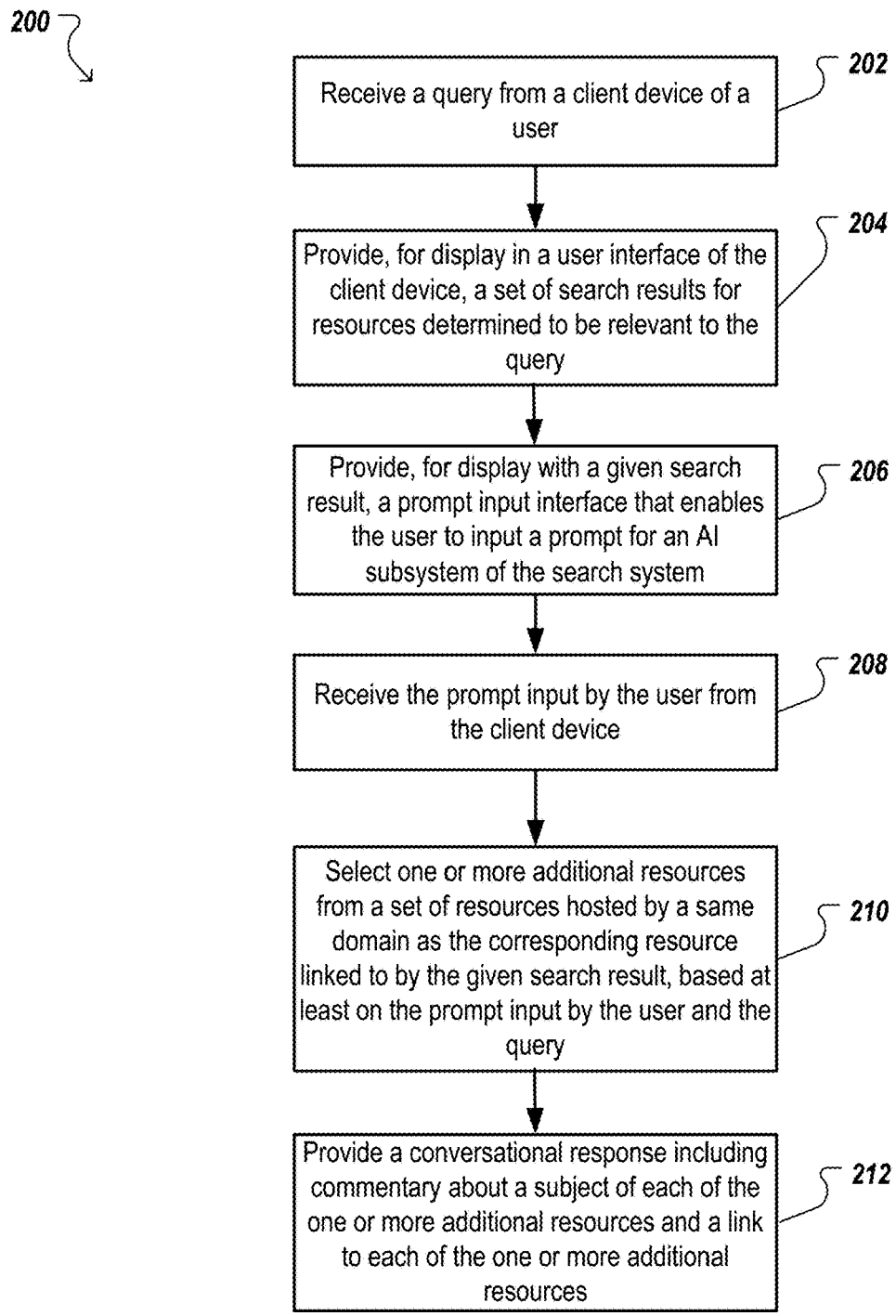
FIG. 2 is a flow chart of an example process for generating responses to prompt-based artificial intelligence searches.

In some implementations, the AI subsystem 160 uses the prompt 172 and the query to determine the user's intent. The AI subsystem 160 generates the output 174 according to the user's intent. The output of the AI subsystem 160 can be provided by the search system 140 to the client device 106 as a conversational response. The output can include the deep links to specific pages. In some implementations, the search system 140 can provide additional prompt input interfaces to further collect the user's prompts 172 and provide additional conversational responses. The query, the given result, the prompts and the conversational responses form a conversation. When the AI subsystem 160 receives a new prompt 172, the AI subsystem 160 can use the previous interaction and the new prompt to determine an updated user's intent, and generate new output according to the updated user's intent. FIGS. 2-3C and associated descriptions provide additional details of these implementations.

Note that, although the operations of the AI subsystem 160 and language model 170 are described above as being performed responsive to receipt of the request 112, at least some of the operations can be performed prior to receipt of the request 112.

Furthermore, although a single language model 170 is shown in FIG. 1, different language models can be specially trained to process different prompts at different stages of the processing pipeline. For example, a more general (e.g., larger) language model can be used to generate the summaries of online content as an offline process (e.g., independent of receipt of the request 112), which can then be inserted into prompts that are input to a more specialized and faster language model in an online process (e.g., real-time in response to receiving the request 112. Additionally, the AI subsystem 160 can generate a set of candidate digital components as an offline process (e.g., prior to receiving the request 112, and store the set of candidate digital components in a database. In this scenario, when the AI subsystem 160 receives the request 112, the AI subsystem 160 can further evaluate and rank the stored candidate digital components based on additional information included in the request and other contextual data (e.g., time of day, day of week, weather conditions, etc.).

FIG. 2 is a flow chart of an example process 200 for prompt-based artificial intelligence searches. Operations of the process 200 can be performed, for example, by the service apparatus 110 of FIG. 1, or another data processing apparatus. The operations of the process 200 can also be implemented as instructions stored on a computer readable medium, which can be non-transitory. Execution of the instructions, by one or more data processing apparatuses, causes the one or more data processing apparatuses to perform operations of the process 200.

At 202, the search system receives a query from a client device of a user. The query can be one or more search terms that are provided by the user. The search system 140 of FIG. 1 identifies resources that include content responsive to the query and provides search results that include links to the identified resources. The query can include a specific set of words, phrases, or questions used to articulate the user's informational needs.

At 204, the search system provides, for display in a user interface of the client device, a set of search results for resources determined to be relevant to the query. Each search result includes information about a corresponding resource and a link to the corresponding resource. The search results can be provided for display in a search results page. For example, the search results page can present an ordered set of search results, where the search results are ordered according to relevance of the corresponding resource to the query and/or based on other criteria.

After receiving the query, the search system can identify a set of resources that include content that satisfy the query, e.g., including information that is relevant to the query. The search system can provide the set of search results as a list. Each search result can include the information about the corresponding resource and a link of the corresponding resource. The link of the resource can be a hyperlink that directs the client device to the resource. The information about the corresponding resource can be a summary or an introduction of the resource. In some examples, the information about the corresponding resource can include an excerpt of content included in the webpage of the resource.

The identified resources can include information that is eligible to be presented in the user interface of the client device. The search system can identify the resources from among a corpus of millions of available resources, e.g., webpages.

At 206, the search system provides, for display with a given search result of the set of search results, a prompt input interface that enables the user to input a prompt for an AI subsystem, e.g., of the search system.

For a given search result, e.g., a given resource or a given digital component, the search system can provide a prompt input interface for the user to input a prompt. This can enable a user to request additional information about a subject (e.g., item) of a search result by providing the prompt input interface with the search result. For example, the prompt input interface can be a text entry box that enables the user to enter textual input. The prompt input interface provides a means for the user to interact with the search system by entering textual information. The prompt can be a natural language input. This enables the user to request specific information or ask specific questions about the specific items.

In some examples, the prompt input interface can be an audio input interface or audio input port that can capture the user's audio input as audio signals and transfer the audio signals into digital form for further processing.

The user can input a prompt using the prompt input interface to provide additional information about the user's needs. The prompt can include text, audios images, and/or videos. By providing a prompt, the user can further clarify the user's specific needs or requests by asking focused questions or submitting focused requests about a specific item.

The prompt provided by the user enables the AI subsystem to more accurately determine the intent of the user and provide more relevant information to the user. For example, the AI subsystem can determine that the user is interested in the particular resource included in the search result that receives the user's prompt, and that the user requests specific information (e.g., indicated by the prompt) about that particular resource.

In some implementations, the search system can provide the prompt input interface to all of the search results. In some implementations, the search system can select a subset of search results to have the prompt input interface. For example, the subset of search results can be selected based on the ranking of the resources linked to by the search results. A predetermined number (e.g., n) of the highest ranked search results are selected to have the prompt input interface. In some examples, the subset of search results can be selected based on a status of the resources linked to by the search results. For instance, the status indicates that the publisher of the resource requested to have the prompt input interface.

At 208, the search system receives the prompt input by the user from the client device. The search system can use the prompt and optionally the query as input to the AI subsystem. In some examples, the search system can provide another input to the AI subsystem including the deep links of a set of resources hosted by the same domain as the resource linked to by the given search result.

At 210, the AI subsystem selects one or more additional resources from the set of resources hosted by the same domain as the corresponding resource linked to by the given search result, based at least on the prompt input by the user and the query. In some examples, the set of resources hosted by the same domain as the corresponding resource linked to can be the various webpages of the same website that hosts the given resource, e.g., webpage identified in the given search result. In some examples, the set of resources can be application pages of native applications (or an index, database, or other data structure that includes such information).

In some implementations, the AI subsystem can use the input, such as the query, user prompt, and optionally the deep links of the set of resources, to select the one or more additional resources. For example, the AI subsystem can query an index of the set of resources using the user's prompt to identify one or more resources of the same website that are most relevant to the prompt. In another example, the AI subsystem can query an index of the set of resources using the user's prompt and the query to identify one or more resources of the same website that are most relevant to the prompt and the query.

In some implementations, the AI subsystem can use the prompt, the query, and/or information about the resource corresponding to the search result in which the prompt is entered, to determine or predict the user's intent. For example, the AI subsystem can generate a prompt based on this information and provide the prompt to an AI model, e.g., an LLM, that is trained to predict user intent based on prompts.

According to the user's intent, the AI subsystem can search the various webpages of the same website (or an index of these resources) and select one or more webpages that satisfy the user's intent. In some implementations, the user's intent can be determined from potential intents including information seeking intent, action seeking intent, navigation seeking intent, or any combination of them. Information seeking intent refers to the user's intent to search, gather, and acquire knowledge or data to fulfill a specific need or to enhance the user's understanding of a particular topic. Action seeking intent refers to the user's intent to seek specific actions and behaviors to achieve a desired outcome or goal. The navigation seeking intent refers to the user's intent to find the way through physical or digital environment, for example, it involves navigating through websites, apps, or other digital interfaces to find specific information, access desired features, or accomplish tasks.

The AI subsystem can use the intent, e.g., in combination with the prompt and/or query, to identify the most relevant resource(s) on the same website to provide as a response, e.g., in the form of deep link(s) to the resource(s). By predicting the user's intent and providing the additional resources, e.g., webpages, according to the user's intent, the AI subsystem can better navigate the user to the right information included in the website. Thus, the technologies described herein can enhance the search result and improve the quality of the search result. Further, by limiting the resources using the user's intent, the AI subsystem will not select resources that are not eligible to be displayed, which reduce the time required to generate the conversational response, and the computing resources required to generate the response. This all contributes to a system capable of generating responses faster, such that they can be created and served in a real time interactive environment—e.g., in response to a user search query.

In some implementations, the AI subsystem can provide an input (e.g., a prompt) that includes the query, the user prompt, and/or information identifying the resource corresponding to the search result in which the user entered the prompt to an AI model (e.g., LLM) that identifies resources that are most relevant to the input. For example, the AI model can be trained to identify relevant resources of websites based on input prompts. In response to the input, the AI model can output one or more deeplinks to relevant resources and optionally a summary of the resource linked to by each deeplink.

At 212, the search system provides a conversational response including commentary about a subject of each of the one or more additional resources and a link to each of the one or more additional resources. These links can be referred to as deep links and they link to specific resources, e.g., to specific webpages.

In some implementations, the commentary can include information responsive to the prompt. For example, if the user requested items that provide certain functionality in the prompt, the conversational response can include the links to the items and the commentary with descriptions on how the items provide the functionality. The commentary can be a summary about the subject of each additional resource, such as the overview, the main information, and/or the purpose of the resource. The link can redirect the user to the webpage including detailed information of the subject of the resource. For example, the commentary about a subject of each of the one or more additional resources can include at least one of (i) a description of the subject of each additional resource, or (ii) a description of information included in each additional resource.

In some implementations, the search system can provide additional prompt input interfaces to further collect the user's prompts and provide additional conversational responses. The query, the given result, the prompts and the conversational responses form a conversation and are presented in a conversational user interface.

For example, after the search system collects the first prompt and provides the first conversational response, the search system can provide a second prompt input interface to enable the user to input a second prompt. The AI subsystem can use the second prompt and the context of previous interaction to determine an updated user's intent. For example, the previous interaction can include the query, the given search result, the previous prompt, e.g., the first prompt, the previous conversational response, e.g., the first conversational response, to update the user's intent. The AI subsystem can select one or more updated resources from the set of resources hosted by the same domain, according to the updated user's intent. The search system can provide a second conversational response including the commentary about a subject of each of the updated resources and a link to each of the updated resources.

The search system can continue this process of collecting a new prompt and providing a new conversational response based on the previous interaction. In this way, the search system can continuously interact with the user and determine the user's intent as the conversation is going. Based on the user's intent, the search system can provide the conversational response that satisfies the user's intent. As a result, the user can receive a specific response directly according to the user's specific needs and requests during the conversation, without having to search the requested information from the various resources included in the domain, e.g., in the website.

In some implementations, the prompt interface can be displayed below the search result, and the conversational response can be displayed below the prompt interface. In some implementations, the prompt interface can be displayed adjacent to the search result, and the conversational response can be displayed adjacent to the prompt. In another example, the prompt interface can be displayed within the search result and/or in other areas of a search results page.

Figure 3A:
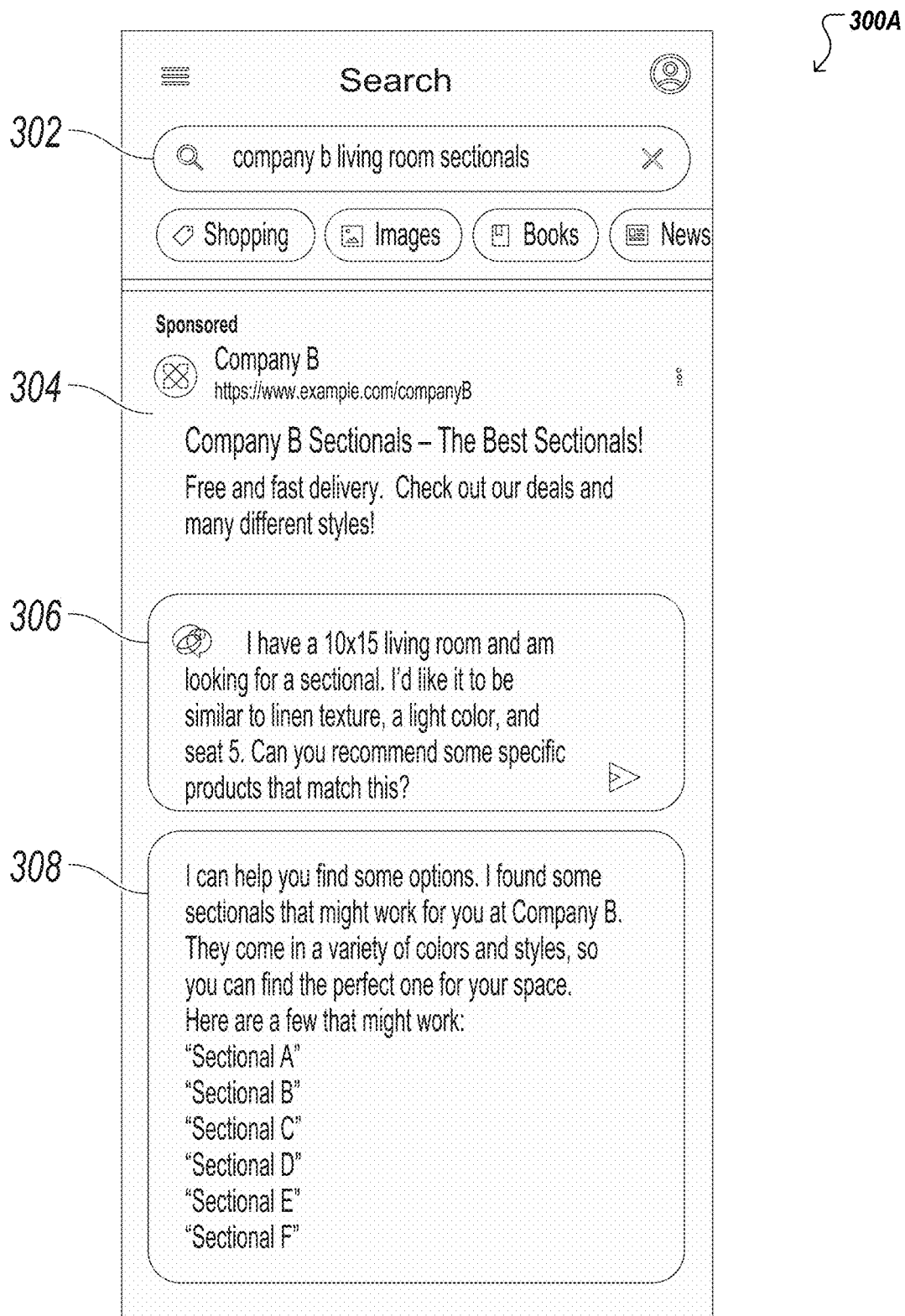
FIGS. 3A-3C are examples of conversational user interfaces for prompt-based artificial intelligence searches.
Figure 3B:
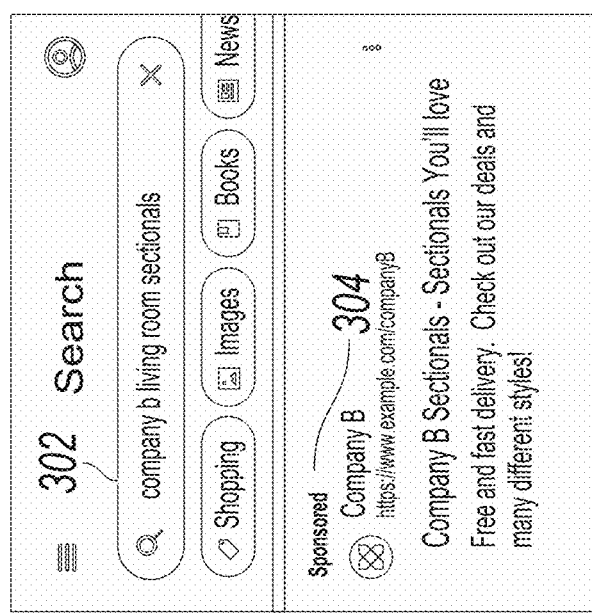
Figure 3C:
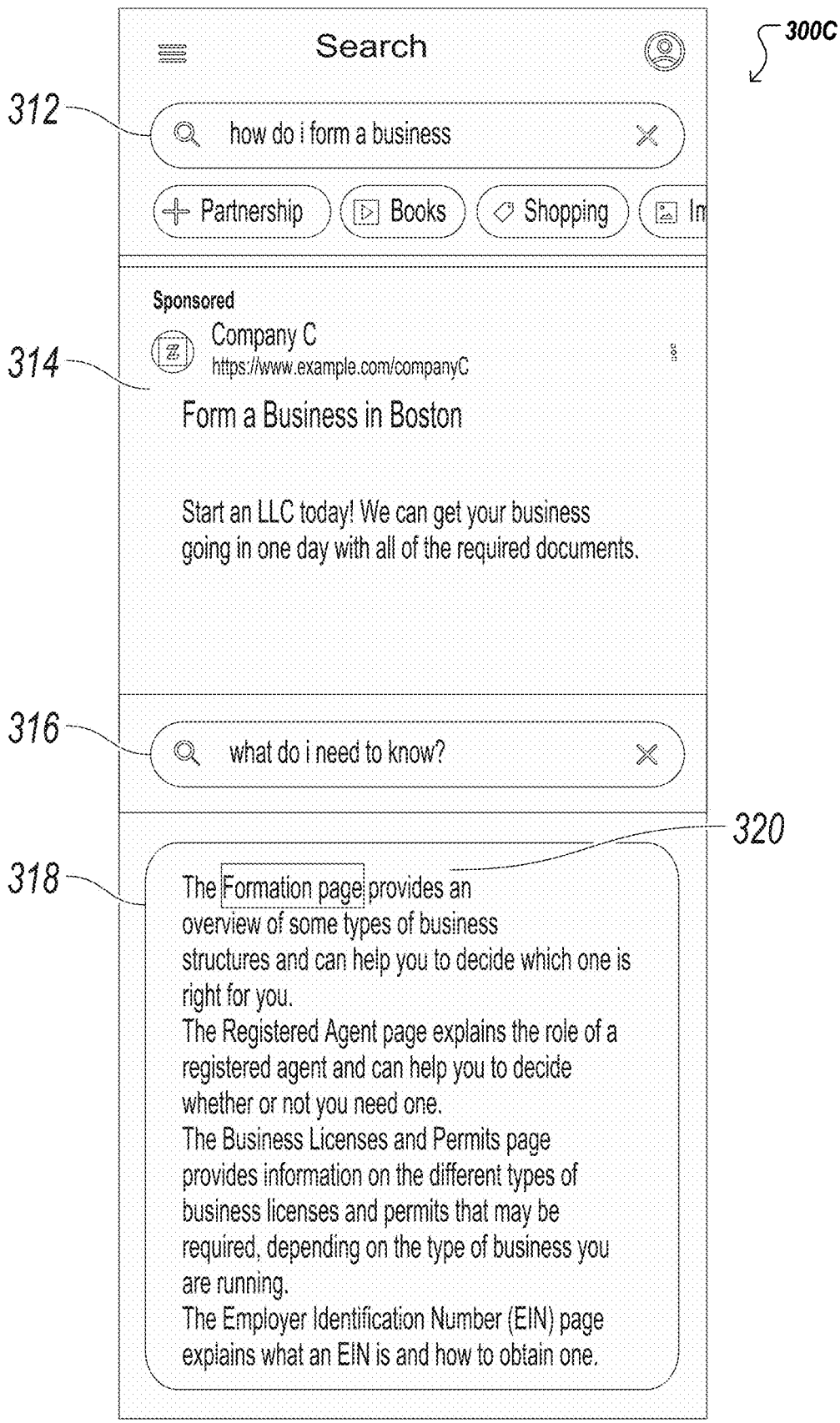

FIGS. 3A-3C show examples of the conversational user interfaces. The layout of the query, the search result, the prompts, and the conversational responses can be arranged in other ways, and is not limited to the examples in FIGS. 3A-3C.

As shown in the example of FIG. 3A, the conversational user interface 300A includes the query 302 received from the user and the given search result 304 for the query. The prompt input interface 306 is displayed below the search result 304. The user can input the prompt using the prompt input interface 306 to request specific information or ask specific questions about specific items included in the given search result 304. The conversational response 308 is displayed below the prompt input interface 306. The conversational response 308 can include links of one or more additional resources from resources hosted by the same domain as the resource linked by the search result 304. The one or more additional resources include information relevant to the user's prompt. For example, each link can be a link to a page that includes content about a particular item, e.g., a particular sectional. The conversational response 308 can also include the commentary about a subject of the one or more additional resources.

As shown in the example of FIG. 3B, the conversational user interface 300B includes the query 302 received from the user and the given search result 304 for the query. The prompt input interface 306 is displayed adjacent to the search result 304. The conversational response 308 is displayed adjacent to the prompt input interface 306.

As shown in the example of FIG. 3C, the conversational user interface 300C include the query 312 received from the user and the given search result 314 for the query. The prompt input interface 316 is provided for the given search result 314 to enable the user to request specific and/or additional information about a subject of the given search result 314. The conversational response 308 is returned to provide information responsive to the prompt. The conversational response 308 can include links of the one or more additional resources. The conversational response 308 can include the commentary about a subject of the one or more additional resources. The commentary can include a description of the subject of each additional resource. For example, "business formation page" 320 is the description of the subject for that particular webpage. The commentary can also include a description of information included in each additional resource. For example, the information following the "business formation page" 320 is a description of the information included in the webpage.

In some implementations, the search system can receive a request including a list of items from the client device of the user. The search system can identify items included in the list from a particular website that offers the items. In some implementations, the particular website is included in the request from the user. In some implementations, the particular website is determined by the search system. For example, the request can be "shopping for back to school supplies for a third grader, here is the shopping list." The shopping list can include the required items, such as backpack, notebook, index cards, etc. Based on the shopping list, the search system can identify each item included in the shopping list on a corresponding link, e.g., webpage, in the website. The search system can automatically add the items into a virtual cart of the particular website. The items in the virtual cart can be associated with the corresponding link of the webpage that includes the detailed information of the item. The virtual cart can be associated with the user's account.

Figure 4:
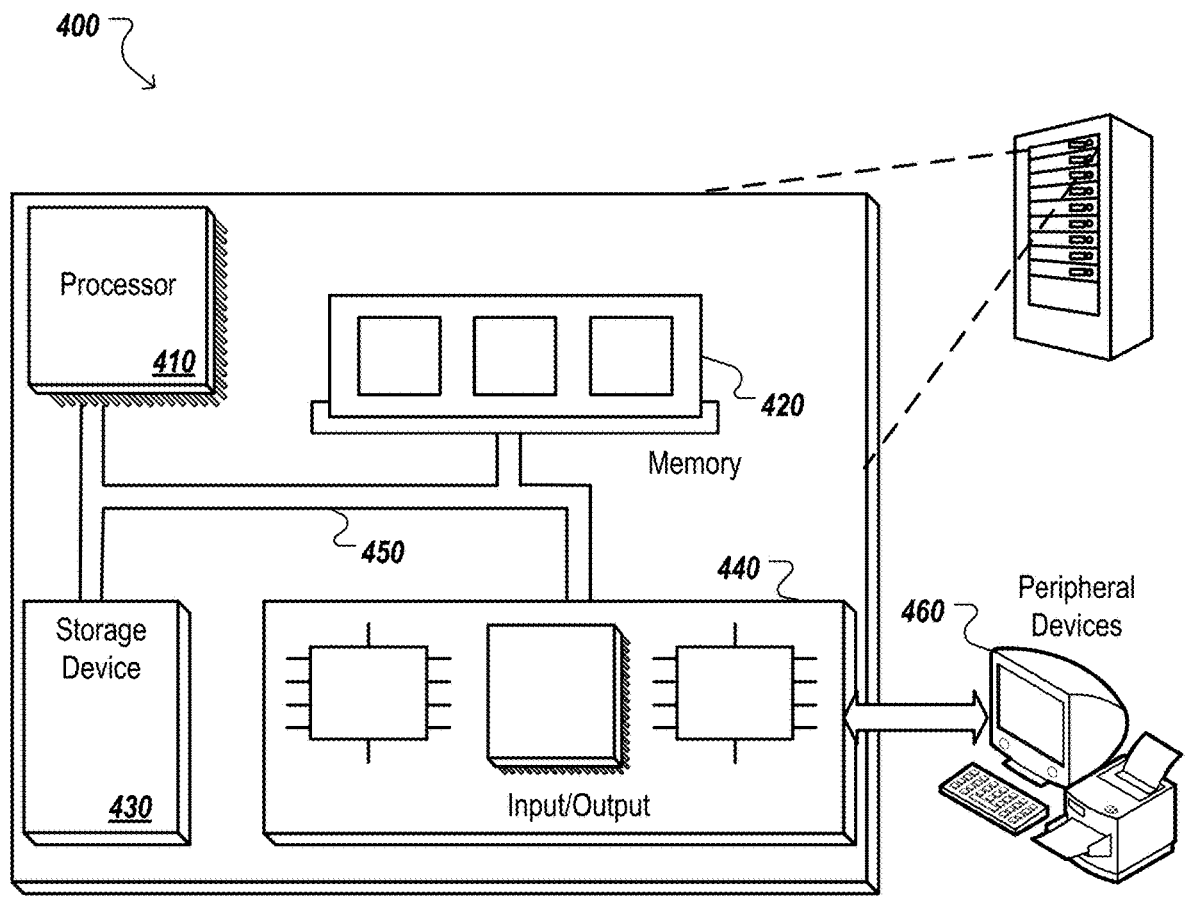
FIG. 4 is a block diagram of an example computer.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other devices, e.g., keyboard, printer, display, and other peripheral devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

For situations in which the systems discussed here collect and/or use personal information about users, the users may be provided with an opportunity to enable/disable or control programs or features that may collect and/or use personal information (e.g., information about a user's social network, social actions or activities, a user's preferences, or a user's current location). In addition, certain data may be treated in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

This document refers to a service apparatus. As used herein, a service apparatus is one or more data processing apparatus that perform operations to facilitate the distribution of content over a network. The service apparatus is depicted as a single block in block diagrams. However, while the service apparatus could be a single device or single set of devices, this disclosure contemplates that the service apparatus could also be a group of devices, or even multiple different systems that communicate in order to provide various content to client devices. For example, the service apparatus could encompass one or more of a search system, a video streaming service, an audio streaming service, an email service, a navigation service, an advertising service, a gaming service, or any other service.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, by a search system, a query from a client device of a user;
   providing, for display in a user interface of the client device, a set of search results for resources determined to be relevant to the query, each search result including information about a corresponding resource and a link to the corresponding resource;
   providing, by the search system and for display with a given search result of the set of search results, a prompt input interface that enables the user to input a prompt for an artificial intelligence subsystem of the search system;
   receiving, from the client device, the prompt input by the user;
   selecting, by the artificial intelligence subsystem using a language model and from a set of resources hosted by a same domain as the corresponding resource linked to by the given search result, one or more additional resources based at least on the prompt input by the user and the query, the selecting comprising providing, to the language model, a prompt generated based on the prompt input by the user and the query; and
   providing, for display with the given search result, a conversational response comprising commentary about a subject of each of the one or more additional resources and a link to each of the one or more additional resources.

2. The method of claim 1, wherein the prompt is a natural language input.

3. The method of claim 1, further comprising:
   providing a second prompt input interface that enables the user to input a second prompt;
   receiving the second prompt input by the user;
   selecting, by the artificial intelligence subsystem and from the set of resources hosted by the same domain, one or more second resources based at least on the query, the prompt, the conversational response, and the second prompt; and
   providing, for display by the client device, a second conversational response including commentary about a subject of each of the one or more second resources and a link to each of the one or more second resources.

4. The method of claim 3, wherein the query, the given search result, the prompt, the conversational response, the second prompt, and the second conversational response form a conversation and are presented in a conversational user interface.

5. The method of claim 1, wherein the prompt is displayed below the given search result, and the conversational response is displayed below the prompt.

6. The method of claim 1, wherein the prompt is displayed adjacent to the given search result, and the conversational response is displayed adjacent to the prompt.

7. The method of claim 1, wherein selecting the one or more additional resources based at least on the prompt input by the user and the query comprises:
   determining a user's intent based at least on the prompt input by the user and the query; and
   selecting the one or more additional resources according to the user's intent.

8. The method of claim 7, wherein the user's intent is determined from potential intents comprising (i) an information seeking intent, (ii) an action seeking intent, (iii) a navigation seeking intent, or any combination of (i) to (iii).

9. The method of claim 1, further comprising:
   receiving a request including a list of items from the client device of the user;
   identifying items included in the list from a particular website that offers the items; and
   adding the items to a virtual cart of the particular website.

10. The method of claim 1, wherein the commentary about a subject of each of the one or more additional resources comprises at least one of (i) a description of the subject of each of the one or more additional resources or (ii) a description of information included in each of the one or more additional resources.

11. A system comprising:
    a search system comprising one or more processors; and one or more storage devices storing instructions that, when executed by the one or more processors, cause the one or more processors to perform operations comprising:

receiving, by the search system, a query from a client device of a user;

providing, for display in a user interface of the client device, a set of search results for resources determined to be relevant to the query, each search result including information about a corresponding resource and a link to the corresponding resource;

providing, by the search system and for display with a given search result of the set of search results, a prompt input interface that enables the user to input a prompt for an artificial intelligence subsystem of the search system;

receiving, from the client device, the prompt input by the user;

selecting, by the artificial intelligence subsystem using a language model and from a set of resources hosted by a same domain as the corresponding resource linked to by the given search result, one or more additional resources based at least on the prompt input by the user and the query, the selecting comprising providing, to the language model, a prompt generated based on the prompt input by the user and the query; and providing, for display with the given search result, a conversational response comprising commentary about a subject of each of the one or more additional resources and a link to each of the one or more additional resources.

12. The system of claim 11, wherein the prompt is a natural language input.

13. The system of claim 11, wherein the operations comprise:

providing a second prompt input interface that enables the user to input a second prompt;

receiving the second prompt input by the user;

selecting, by the artificial intelligence subsystem and from the set of resources hosted by the same domain, one or more second resources based at least on the query, the prompt, the conversational response, and the second prompt; and providing, for display by the client device, a second conversational response including commentary about a subject of each of the one or more second resources and a link to each of the one or more second resources.

14. The system of claim 13, wherein the query, the given search result, the prompt, the conversational response, the second prompt, and the second conversational response form a conversation and are presented in a conversational user interface.

15. The system of claim 11, wherein the prompt is displayed below the given search result, and the conversational response is displayed below the prompt.

16. The system of claim 11, wherein the prompt is displayed adjacent to the given search result, and the conversational response is displayed adjacent to the prompt.

17. The system of claim 11, wherein selecting the one or more additional resources based at least on the prompt input by the user and the query comprises:

determining a user's intent based at least on the prompt input by the user and the query; and selecting the one or more additional resources according to the user's intent.

18. The system of claim 17, wherein the user's intent is determined from potential intents comprising (i) an information seeking intent, (ii) an action seeking intent, (iii) a navigation seeking intent, or any combination of (i) to (iii).

19. The system of claim 11, wherein the operations comprise:

receiving a request including a list of items from the client device of the user;

identifying items included in the list from a particular website that offers the items; and adding the items to a virtual cart of the particular website.

20. A non-transitory computer readable medium carrying instructions that, when executed by one or more processors of a search system, cause the one or more processors to perform operations comprising:

receiving, by the search system, a query from a client device of a user;

providing, for display in a user interface of the client device, a set of search results for resources determined to be relevant to the query, each search result including information about a corresponding resource and a link to the corresponding resource;

providing, by the search system and for display with a given search result of the set of search results, a prompt input interface that enables the user to input a prompt for an artificial intelligence subsystem of the search system;

receiving, from the client device, the prompt input by the user;

selecting, by the artificial intelligence subsystem using a language model and from a set of resources hosted by a same domain as the corresponding resource linked to by the given search result, one or more additional resources based at least on the prompt input by the user and the query, the selecting comprising providing, to the language model, a prompt generated based on the prompt input by the user and the query; and providing, for display with the given search result, a conversational response comprising commentary about a subject of each of the one or more additional resources and a link to each of the one or more additional resources.

* * * * *